United States Patent
Haruma et al.

(10) Patent No.: US 7,325,112 B2
(45) Date of Patent: Jan. 29, 2008

(54) HIGH-SPEED SNAPSHOT METHOD

(75) Inventors: Yumiko Haruma, Yokohama (JP); Koji Sugiyama, Yokohama (JP); Kei Kubo, Yokohama (JP); Yoshihito Yugami, Samukawa (JP); Shinji Morita, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 11/454,255

(22) Filed: Jun. 16, 2006

(65) Prior Publication Data

US 2006/0236051 A1 Oct. 19, 2006

Related U.S. Application Data

(62) Division of application No. 10/753,623, filed on Jan. 7, 2004, now abandoned.

(30) Foreign Application Priority Data

Aug. 6, 2003 (JP) .............................. 2003-206170

(51) Int. Cl.
*G06F 12/06* (2006.01)
*G06F 17/30* (2006.01)

(52) U.S. Cl. .................. 711/162; 711/170; 711/167

(58) Field of Classification Search .............. 711/162, 711/161, 165, 170, 204, 167; 707/204
See application file for complete search history.

(56) References Cited

U.S. PATENT DOCUMENTS 5,649,152 A 7/1997 Ohran et al.
6,678,809 B1 1/2004 Delaney et al.
6,748,504 B2 * 6/2004 Sawdon et al. .............. 711/162
6,799,258 B1 * 9/2004 Linde .......................... 711/162
6,807,605 B2 10/2004 Umberger et al.
6,907,505 B2 6/2005 Cochran et al.
2004/0181642 A1 9/2004 Watanabe et al.
2005/0033800 A1 2/2005 Kavuri et al.
2005/0138312 A1 * 6/2005 Kubo et al. .................. 711/162
2006/0080370 A1 * 4/2006 Torii et al. ................... 707/204

FOREIGN PATENT DOCUMENTS

JP 2001-306407 A 11/2001

OTHER PUBLICATIONS

Dishon et al., "Disk Dual Copy Methods and Their Performance", Eighteenth International Symposium on Fault-Tolerant Computing, IEEE Comput. Soc. Press 1988, pp. 314-319, Jun. 1988.*
Microsoft Windows 2000 Server Operating System: Developing Hardware Snapshot Providers for Whistler (White Paper, Updated for Whistler Server Beta 3).*

* cited by examiner

*Primary Examiner*—Pierre-Michel Bataille
(74) *Attorney, Agent, or Firm*—Townsend and Townsend and Crew LLP

(57) ABSTRACT

When a snapshot of data is taken, it is after a write request comes from the host equipment that old data on the source-side magnetic disk to the snapshot-side magnetic disk; therefore, it takes a long time before new data is actually written in the source-side magnetic disk. To overcome this problem, by analyzing data update information, and from a result of analysis, by deciding an area that has high possibility of receiving a request to write data, and having data of that area previously copied to the snapshot-side magnetic disk, it is possible to take a snapshot very quickly.

11 Claims, 15 Drawing Sheets

FIG. 2

MAGNETIC DISK INFORMATION TABLE (125)

| HOST EQUIPMENT NO. (201) | MAGNETIC DISK PAIR INFORMATION (202) | | AREA INFO (203) | | READ / WRITE INFO (204) |
|---|---|---|---|---|---|
| | SOURCE-SIDE NO. | SNAP-SIDE NO. | LBA | WRITE CAPACITY (SECTORS) | |
| 110 | 150 | 160 | 0 | 10 | WRITE |
| ⋮ | ⋮ | ⋮ | ⋮ | ⋮ | ⋮ |

FIG. 3

WRITE-AHEAD INFORMATION TABLE (126)

| SOURCE-SIDE MAGNETIC DISK NO. (301) | DATA WRITE-AHEAD AREA INFO (302) | |
|---|---|---|
| | LBA | WRITE CAPACITY (SECTORS) |
| 150 | 0 | 20 |
| 150 | 10 | 30 |
| ⋮ | ⋮ | ⋮ |

FIG. 4

READ-AHEAD INFORMATION TABLE (127)

| SOURCE-SIDE MAGNETIC DISK NO. (401) | DATA READ-AHEAD AREA INFO (402) ||  READ-AHEAD DATA (403) |
| --- | --- | --- | --- |
| | LBA | WRITE CAPACITY (SECTORS) | |
| 150 | 10 | 30 | DATA 1 |
| ⋮ | ⋮ | ⋮ | ⋮ |

FIG. 5

DATA UPDATE INFORMATION TABLE (128) EX.1

| HOST EQUIPMENT NO. (501) | SOURCE-SIDE MAGNETIC DISK NO. (502) | DATA WRITE AREA INFO (503) ||
| --- | --- | --- | --- |
| | | LBA | WRITE CAPACITY (SECTORS) |
| HOST 1 | DISK 1 | 0 | 20 |
| HOST 2 | DISK 2 | 0 | 30 |
| HOST 3 | DISK 3 | 0 | 20 |
| ⋮ | ⋮ | ⋮ | ⋮ |
| HOST n | DISK n | 0 | 50 |

EXAMPLE WHERE DATA IS WRITTEN BY SEQUENTIAL ACCESS

EXAMPLE WHERE DATA IS WRITTEN BY RANDOM ACCESS

EXAMPLE WHERE DATA IS WRITTEN BASED ON
ACCESS FREQUENCY ANALYSIS

FIG. 17

DATA UPDATE INFORMATION TABLE (128) EX.2

| HOST EQUIPMENT NO. | SOURCE-SIDE MAGNETIC DISK NO. | DATA WRITE AREA INFO ||
|---|---|---|---|
| | | LBA | WRITE CAPACITY (BYTES) |
| HOST 1 | DISK 1 | 0 | 20 |
| HOST 2 | DISK 2 | 0 | 20 |
| HOST 3 | DISK 3 | 0 | 20 |
| HOST 4 | DISK 4 | 0 | 20 |
| HOST 5 | DISK 5 | 0 | 20 |
| ⋮ | ⋮ | ⋮ | ⋮ |
| HOST n | DISK n | 0 | 20 |

DATA UPDATE INFORMATION TABLE (128) EX.3

| HOST EQUIPMENT NO. | SOURCE-SIDE MAGNETIC DISK NO. | DATA WRITE AREA INFO (LBA) |
|---|---|---|
| HOST 1 | DISK 1 | 0 |
| HOST 2 | DISK 2 | 0 |
| HOST 3 | DISK 3 | 0 |
| ⋮ | ⋮ | ⋮ |
| HOST n | DISK n | 0 |

1501, 1502, 1503

EMBODIMENT OF COPY RETURN

HIGH-SPEED SNAPSHOT METHOD

BACKGROUND OF THE INVENTION

The present invention relates to a high-speed snapshot function of copying a content in an area of a source-side magnetic disk at a point in time to a corresponding area in a snapshot-side magnetic disk, the content being overwritten by new data after the above-mentioned point in time, and also to host equipment, a switch, and a storage system as means for realizing the high-speed snapshot.

In the prior art of snapshot technology, when a request to write data to the source-side magnetic disk comes from the host equipment, data present in the area is copied to the snapshot-side magnetic disk. After copying data to the snapshot-side is finished, new data is written in the source-side magnetic disk. When the host equipment again issues a request to write data to the source-side magnetic disk, just as mentioned above, data in the specified area is copied to the snapshot-side magnetic disk, and then new data is written to the source-side magnetic disk. This technology is disclosed in U.S. Pat. No. 5,649,152.

The snapshot copy, such as mentioned above, can be controlled by the host equipment or the storage system.

As a method for managing snapshot, there is a technology in which in a case a snapshot is not taken, when data is written from host equipment to an external storage device, data is written in a plurality of storage media to thereby provide a couple of storage areas in which data is stored, and when a snapshot is taken, one of the paired storage areas is used as an area for ordinary access, and the other storage area is used for snapshot. This technology is disclosed in JP-A-2001-306407.

SUMMARY OF THE INVENTION

In the prior art, it is after a write request comes from the host equipment that old data on the source-side magnetic disk is copied to the snapshot-side magnetic disk; therefore, it takes time before new data is actually written in the source-side magnetic disk. The method disclosed in JP-A-2001-306407 is a snapshot managing method in the host equipment, for which reason it is impossible to manage snapshots by the switch or the storage system.

To solve this problem, the present invention has as its object to provide a high-speed snapshot method, host equipment, a switch, and a storage system.

A write-ahead/read-ahead function for a high-speed snapshot is added to the host equipment for controlling snapshot, the switch and the storage system. More specifically, the present invention provides means for analyzing a data writing history, means for automatically deciding a write-ahead area and a read-ahead area from a result of analysis, means for copying data in a decided write-ahead area to the snapshot-side magnetic disk before new data is written in that write area, and means for previously storing data in a decided read-ahead area into a memory.

BRIEF DESCRIPTION OF THE DRAWINGS

FIG. 2 is a magnetic disk information table;

FIG. 3 is a write-ahead information table;

FIG. 4 is a read-ahead information table;

FIG. 5 is a data update information table;

FIG. 17 shows an example of a data update information table;

FIG. 18 shows an example of a data update information table; and

DESCRIPTION OF THE EMBODIMENT

A preferred embodiment will be described with reference to FIGS. 1~18.

In the following description, a write-ahead indicates a function by which to have previously placed in a snapshot-side magnetic disk, data in an area where data is highly likely to be written (hereafter referred to as a write-ahead area). A read-ahead indicates a function by which to place in memory, data in an area where data is likely to be written with likelihood second highest next to the above-mentioned write-ahead area (hereafter referred to a read-ahead area).

In this embodiment, snapshot is controlled by a switch, and it is assumed that write-ahead/read-ahead is carried out after new data has been written in a source-side magnetic disk in response to a write request from host equipment, such as a host computer.

Figure 1:
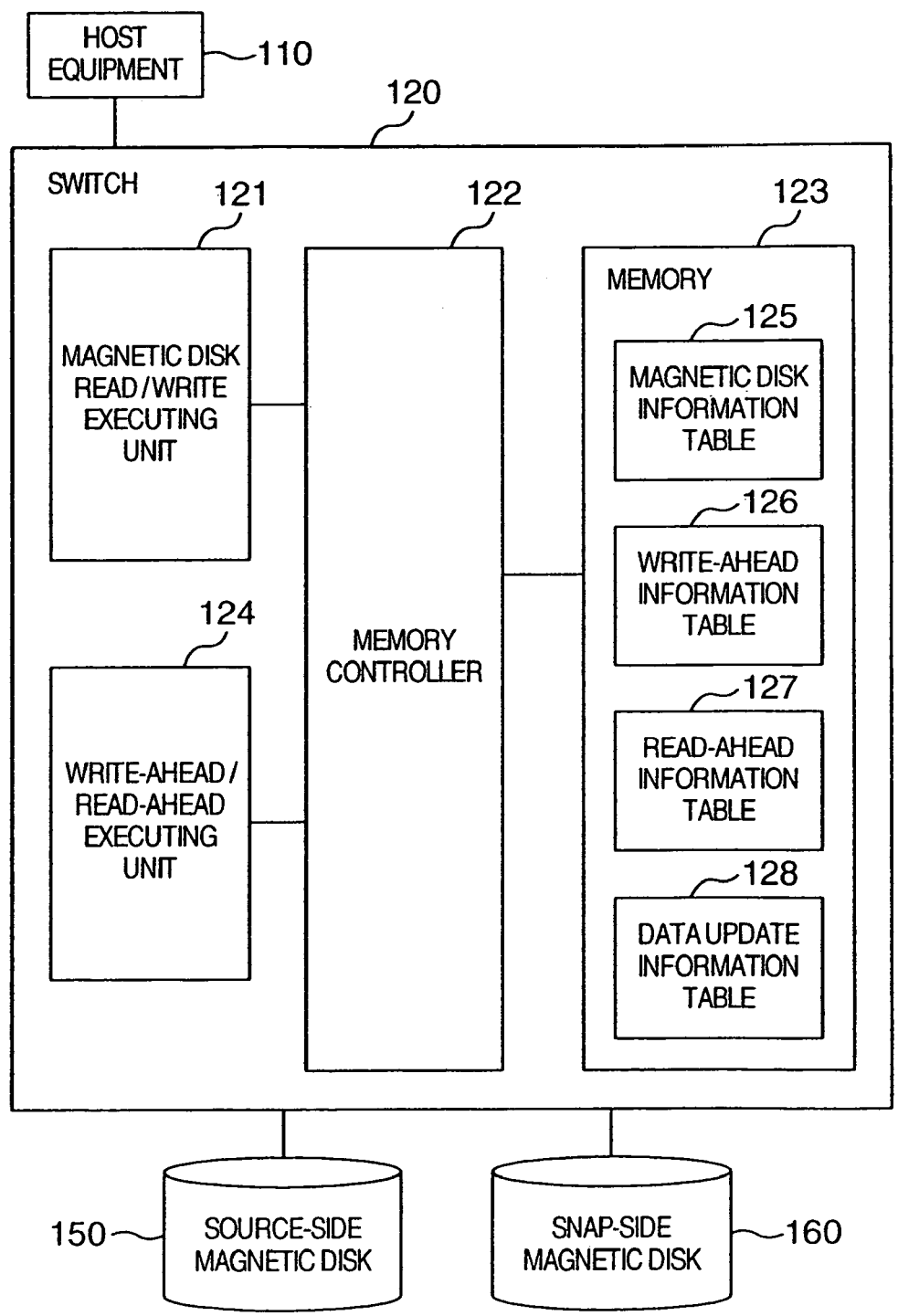
FIG. 1 is a diagram of a structure for realizing speeding up of a snapshot.

Description will start with the structure of the present invention with reference to FIG. 1.

The host equipment 110 is connected to a source-side magnetic disk 150 and a snapshot-side magnetic disk 160 by a switch 120. The host equipment 110 can access data in the source-side magnetic disk 150 and the snapshot-side magnetic disk through the switch 120. The switch 120 is a snapshot controller that embodies the present invention and, by a request from the host equipment, reads data from the source-side magnetic disk 150 and places in the snapshot-side magnetic disk 160, a copy of old data in the area to write data in. The switch 120 comprises a magnetic disk read/write executing unit 121 for reading/writing data by a request from the host equipment, a write-ahead/read-ahead executing unit 124 for writing ahead or reading ahead data in the source-side magnetic disk, a memory controller 122 for reading or writing necessary information to and from memory, and a memory 123 for storing necessary information. The memory 123 comprises a magnetic disk information table 125, a write-ahead information table 126, a read-ahead information table 127, and a data update information table 128.

FIG. 2 is the magnetic disk information table 125. This table includes host equipment information 201 for showing from which host equipment a read/write request came, magnetic disk pair information 202 for snapshot operation, area information 203 for showing how many sectors of data are written or read in which area, and read-ahead/write-ahead information 204 for showing whether to read or write.

FIG. 3 is a write-ahead information table 126. This table includes source-side magnetic disk numbers 301 showing data of which magnetic disk is written ahead, and data write-ahead area information 302 for showing how many sectors of data of which area are written ahead.

FIG. 4 is a read-ahead information table 127. This table includes source-side magnetic disk numbers 401 for showing data of which magnetic disk is read ahead, data read-ahead area information 402 for showing how many sectors of data of which magnetic disk are read ahead, and read-ahead data 403 for showing data read ahead.

FIG. 5 is a data update information table 128. This table includes source-side magnetic disk numbers 502 for showing which host equipment a write request came from, source-side magnetic disk numbers 502 for showing a magnetic disk where new data was written, and data write area information 503 for showing an area where new data was written and the number of sectors of data written. By analyzing the data update log recorded in this table, it is possible to decide a write-ahead and a read-ahead area.

Figure 6:
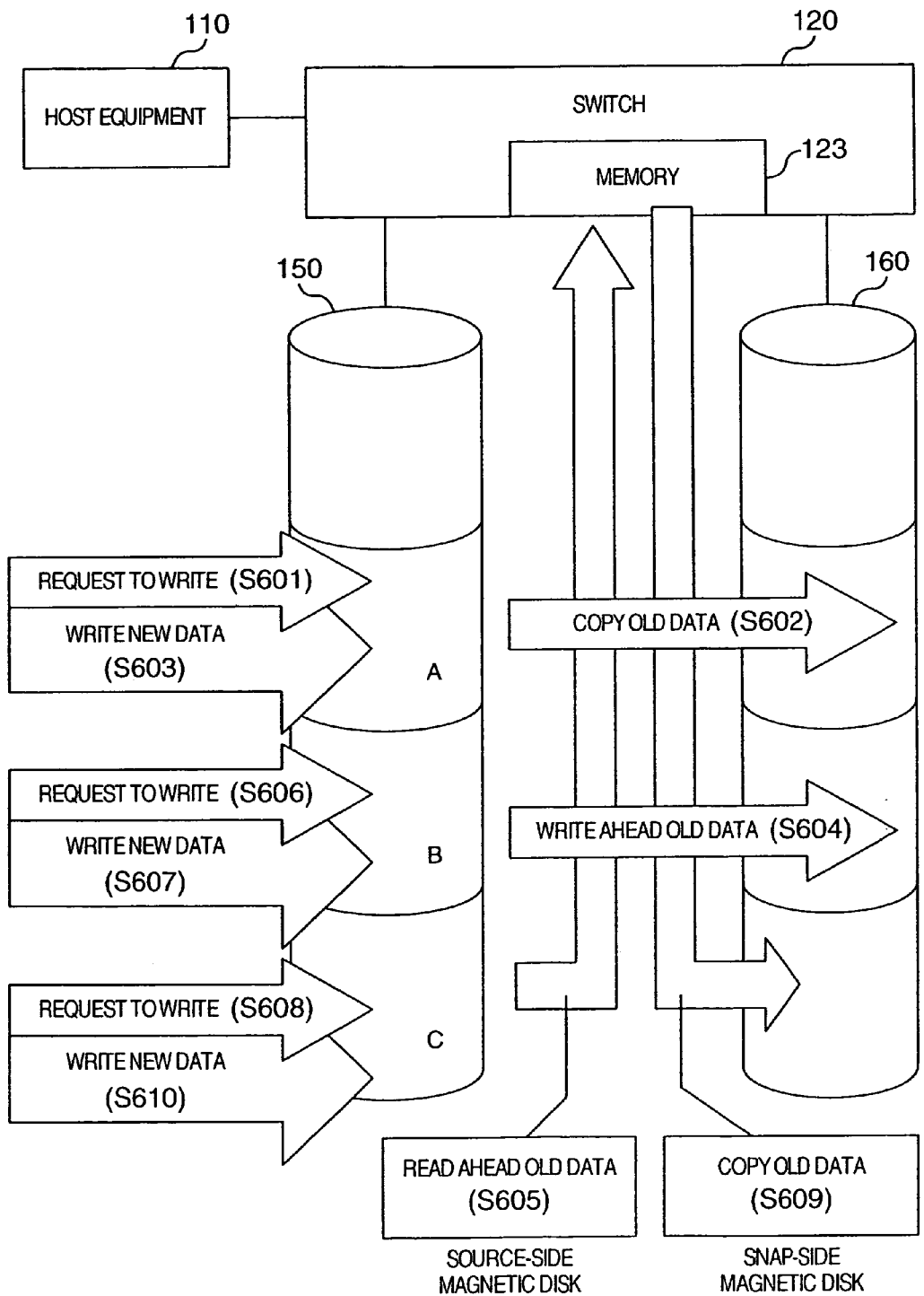
FIG. 6 shows a schematic procedure of speeding up of a snapshot.

Referring to FIG. 6, description will be made of a schematic procedure of a method of speeding up snapshot according to the present invention.

The host equipment is connected through the switch 120 to the source-side magnetic disk 150 and the snapshot-side magnetic disk 160. On receiving a request to write data in an area A of the source-side magnetic disk 150 from the host equipment 110 (S601), the switch 120 copies old data of the source-side magnetic disk 150 (S602) and writes new data in the area A of the source-side magnetic disk 150 (S603). Then, the switch 120 performs a process for high-speed snapshot as follows. The switch 120 analyzes the areas where data were written by that point in time and decides a write-ahead and a read-ahead area. In this example, it is assumed that the write-ahead area is decided as an area B located continuous to the area A. It is also assumed that the read-ahead area is decided as an area C continuous to the area B.

The switch 120 previously copies old data of the decided write-ahead area B to the snapshot-side magnetic disk (S604). Old data in the read-ahead area C is stored in a memory 123 in the switch 120 (S605).

When a request comes again from the host equipment 110 to write data in the area B of the source-side magnetic disk 150 (S606), because the data in the area B was already copied to the snapshot-side magnetic disk 160 in Step S604, the switch 120 can immediately write new data to the area B of the source-side magnetic disk 150 (S607).

Further, when a request comes again from the host equipment 110 to write data in the area C of the source-side magnetic disk 150 (S608), because the data in the area C has been stored in the memory 123 in the switch 120 in S605, the switch 120, without accessing the area C of the source-side magnetic disk 150, can quickly copy data in the memory 123 to the snapshot-side magnetic disk 160 (S609) and write new data to the area C of the source-side magnetic disk 150 (S610).

Various operations will be described in detail with reference to FIGS. 1, 7~12.

Figure 7:
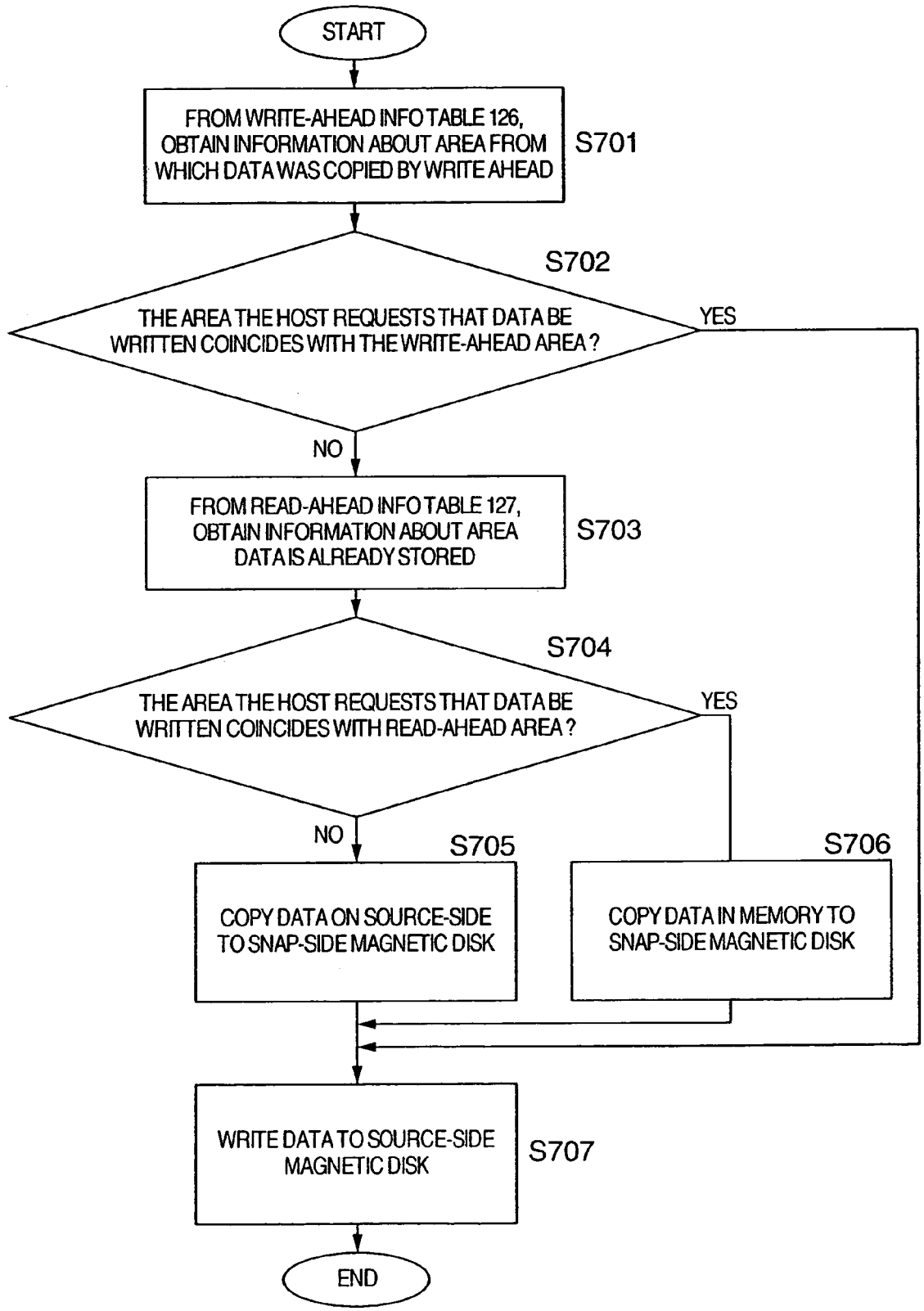
FIG. 7 is a flowchart showing a process of deciding the states of write-ahead/read-ahead areas and writing data.

FIG. 7 is a flowchart showing a process of deciding the states of write-ahead/read-ahead areas and writing data in the magnetic disk read/write executing unit 121.

When a data write request comes from the host equipment 110, the switch 120 obtains from the write-ahead-information table 126 information about the areas data of which has been written ahead to the snapshot-side magnetic disk 160 (S701). A decision is made if the area the host equipment is making a request to write data in coincides with the area data on which has already been copied to the snapshot-side magnetic disk (S702). If the result of the decision shows that the area data is to be written in coincides with the area from which data was copied, new data is written to the source-side magnetic disk 150, by which the process is finished (S707).

As a result of the decision, if there is not coincidence about the areas, information about the area data on which was already stored in the memory by a read-ahead operation is obtained from the read-ahead information table 127 (S703). And, a decision is made if the area where the host equipment is making a request to write data coincides with the area from which data was already copied by a read-ahead operation (S704). If the result of decision shows the area where data is to be written coincides with the area from which data was copied by a read-ahead operation, read-ahead data previously recorded in the read-ahead information table 127 in the memory 123 is copied to the snapshot-side magnetic disk 160 (S706), and new data is written to the source-side magnetic disk 150 (S707), by which the process is finished.

As a result of decision, if the area where data is to be written does not coincide with either the write-ahead area or the read-ahead area, as usual the data on the source-side magnetic disk 150 is copied to the snapshot-side magnetic disk 160 (S705), then new data is written to the source-side magnetic disk 150 (S707), by which the process is finished.

Figure 8:
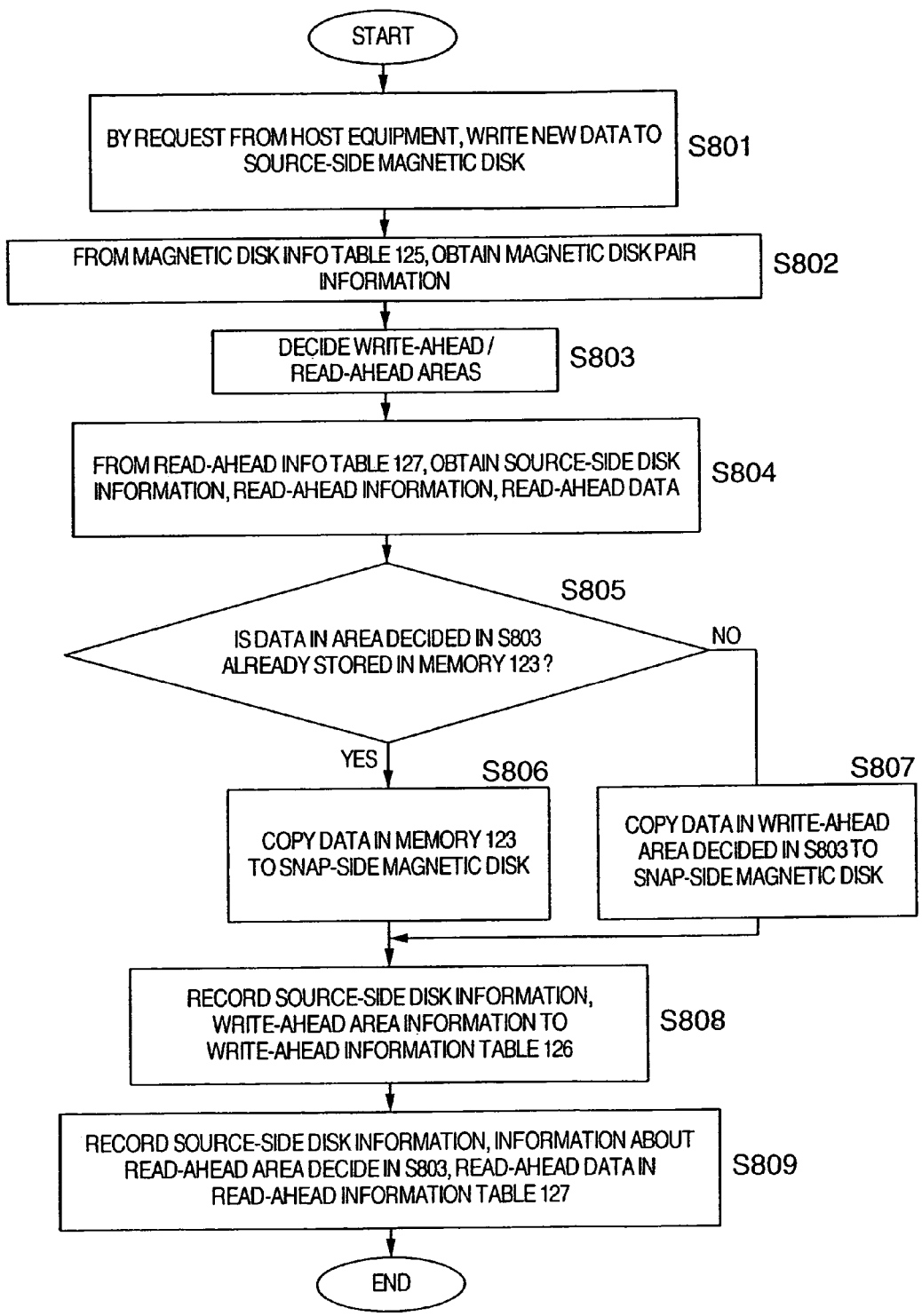
FIG. 8 is a flowchart showing a write-ahead/read-ahead process.
Figure 9:
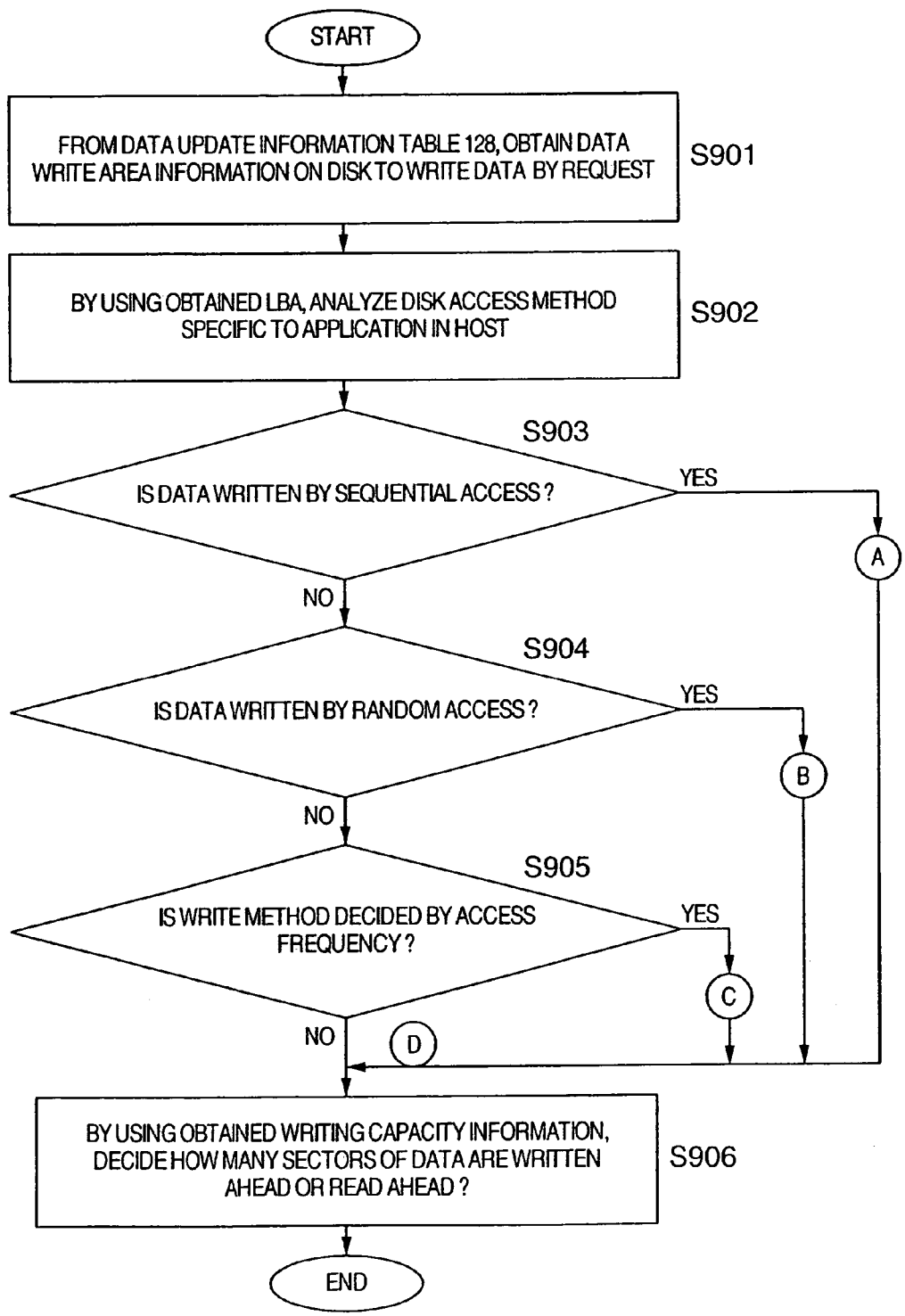
FIG. 9 is a flowchart (Part 1) showing a process of deciding write-ahead/read-ahead areas.
Figure 10:
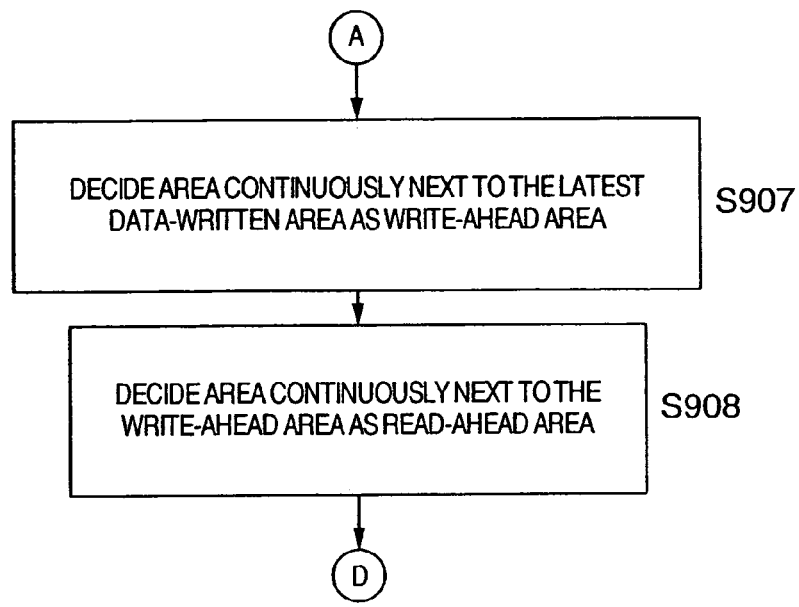
FIG. 10 is a flowchart (Part 2) showing a process of deciding a write-ahead/read-ahead area.
Figure 11:
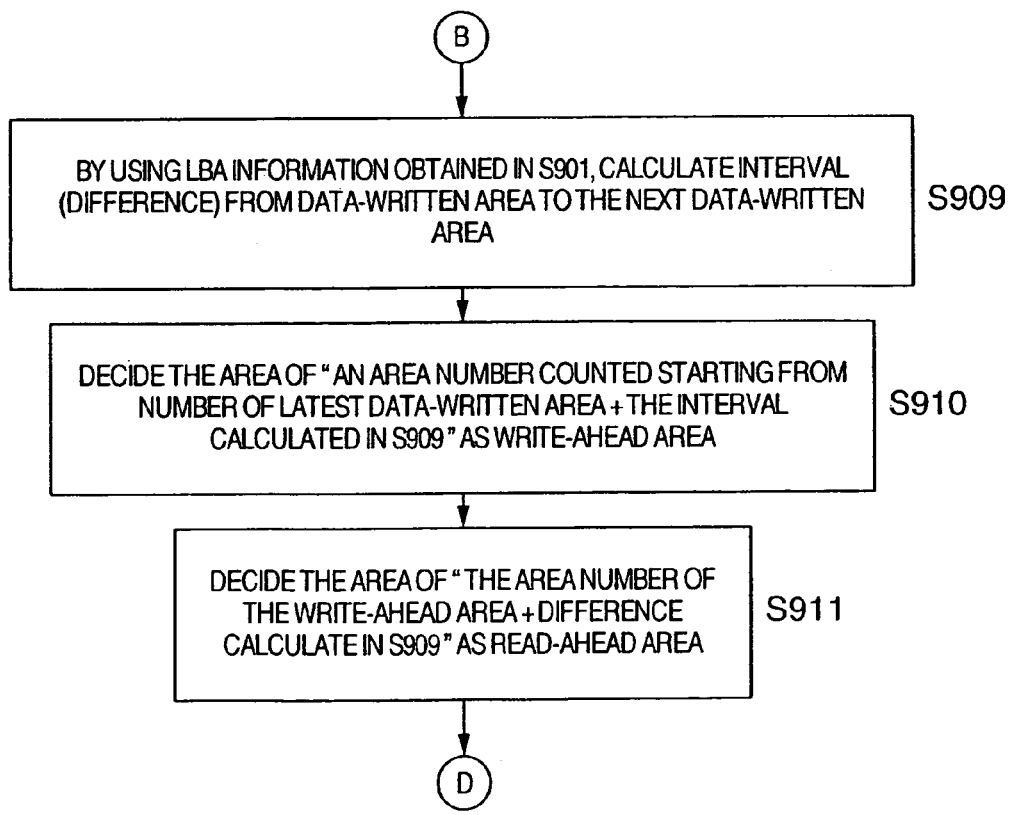
FIG. 11 is a flowchart (Part 3) showing a process of deciding a write-ahead/read-ahead area.
Figure 12:
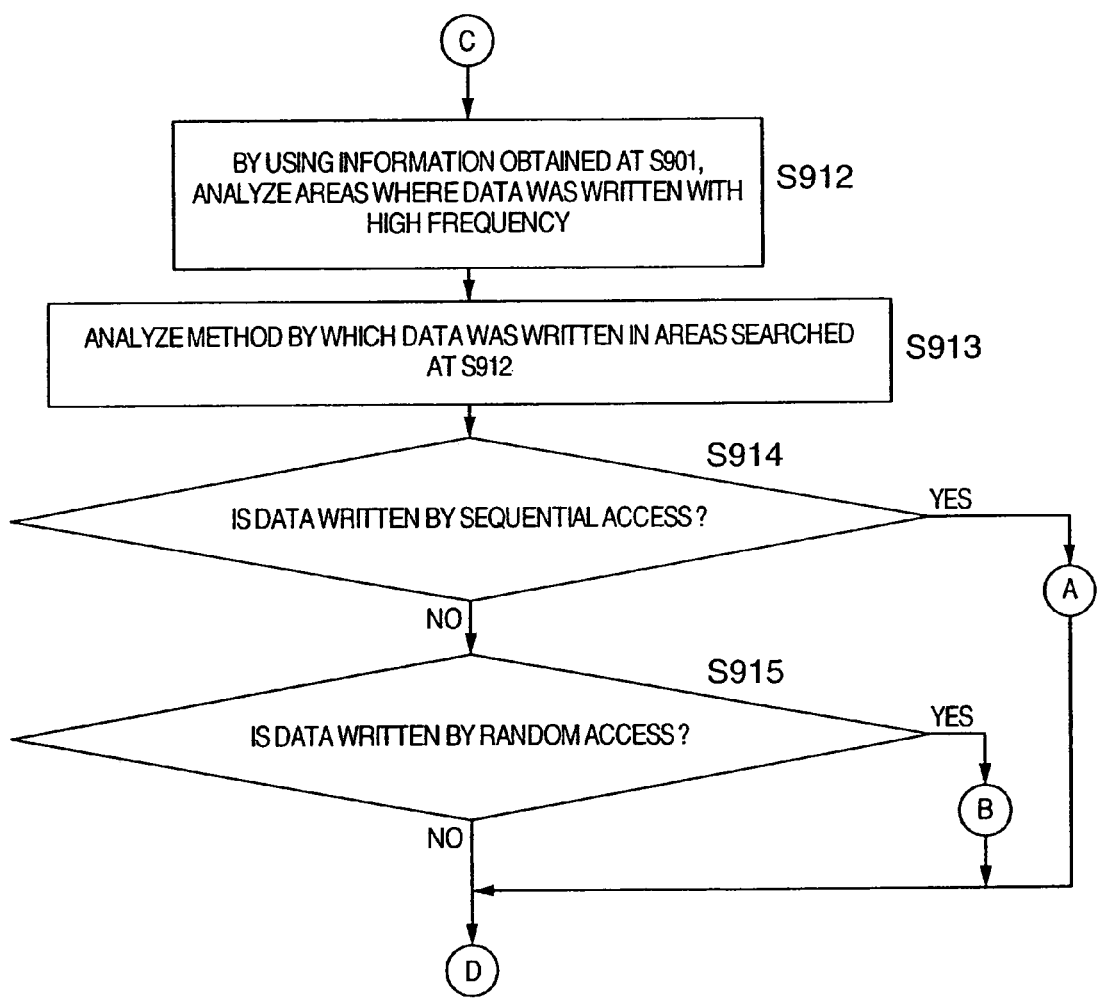
FIG. 12 is a flowchart (Part 4) showing a process of deciding a write-ahead/read-ahead area.

FIG. 8 is a flowchart showing the write-ahead/read-ahead process in the write-ahead/read-ahead executing unit 124 in FIG. 1. As shown in FIG. 7, after new data is written in the source-side magnetic disk 150, the write-ahead area and the read-ahead area are recorded in the respective tables.

In this embodiment, description will be made of a case where after new data is written into the source-side magnetic disk 150 by a write request from the host equipment 110 (S801), a write-ahead and a read-ahead are carried out. From the magnetic disk information table 125, information is obtained about the magnetic disks that form the above-mentioned pair of magnetic disks (S802). After this, a write-ahead area and a read-ahead area are decided (S803). From the read-ahead information table 127, source-side magnetic disk numbers, read-ahead area information and read-ahead data are obtained (S804). By using information obtained at S804, a decision is made if data in the write-ahead area decided in step S803 has been already stored in the memory 123 (S805).

As a result of decision, if data in the write-ahead area decided in step S803 has been already stored in the memory 123 by a previous data writing operation, the data in the memory is copied to the snapshot-side magnetic disk (S806), and the area from which data was copied is recorded as a write-ahead-area in the write-ahead information table 126 (S808). As a result of decision, if data in the write-ahead area decided in step S803 is not stored in the memory 123, the data in the write-ahead area is copied to the snapshot-side magnetic disk 160 (S807), and the area from which data was written ahead is recorded in the write-ahead information table (S808). Subsequently, information about the read-ahead area decided in step S803, including source-side magnetic disk numbers, data read-ahead area information, and data in read-ahead area, is recorded in the read-ahead information table 127 (S809).

Referring to FIGS. 9~16, detailed description will be made of a method for deciding a write-ahead area and a read-ahead area.

FIGS. 9~12 are flowcharts of deciding a write-ahead area and a read-ahead area (S803) in FIG. 8.

To decide a write-ahead area and a read-ahead area, data-write log information to the source-side magnetic disk 150 is obtained from data-update information table 128 (S901). To be more specific, the log information includes host equipment numbers, source-side magnetic disk numbers, and data write areas. The host equipment numbers show from which hosts came requests to write The source-side magnetic disk numbers show the numbers of source-side magnetic disks where data was written. The data write area information shows the location where data writing began by LBA (Logical Block Addressing), and data-writing capacity in sector units. By using LBA information, the magnetic disk access method specific to the application in the host equipment is analyzed (S902).

If this analysis shows that data was written by sequential access (S903), the area continuously next to the latest area where data was written is decided as a write-ahead area (S907). And, the area continuously next to the write-ahead area is decided as a read-ahead area (S908). If random access was used for writing data (S904) in other areas, an interval (a difference in area number) between an area where data was written and the next area where data was written is calculated (S909). By using the result of calculation, the area of an area number counted starting from the number of the latest data-written area (this area number is the area number of the latest data-written area+the difference calculated at S909) is decided as a write-ahead area (S910). On the other hand, the area of "the area number of the above-mentioned write-ahead area+the difference calculated at S909" is decided as a read-ahead area (S911).

When analyzing the method for writing data by access frequency analysis (S905), the areas where data was written with high frequency are analyzed by using information obtained in S901 (S912), the method by which data was written in the areas where the writing frequency is higher than a predetermined value is analyzed (S913); for example, in a case where data is to be written by sequential access (S914), steps S907 and S908 are carried out, and in a case where data is to be written by random access (S915), steps S909 to S911 are carried out. After this, by using obtained data-writing capacity information, a decision is made how many sectors of data are written ahead or read ahead (S906). For example, if the write capacity information in the data write area information in the data update information table 128 has the area divided in units of 20 sectors, a decision is derived that it is highly likely that the average value of data to be written next is 20 sectors, and the amount of data to write ahead or read ahead is set as 20 sectors.

Figure 13:
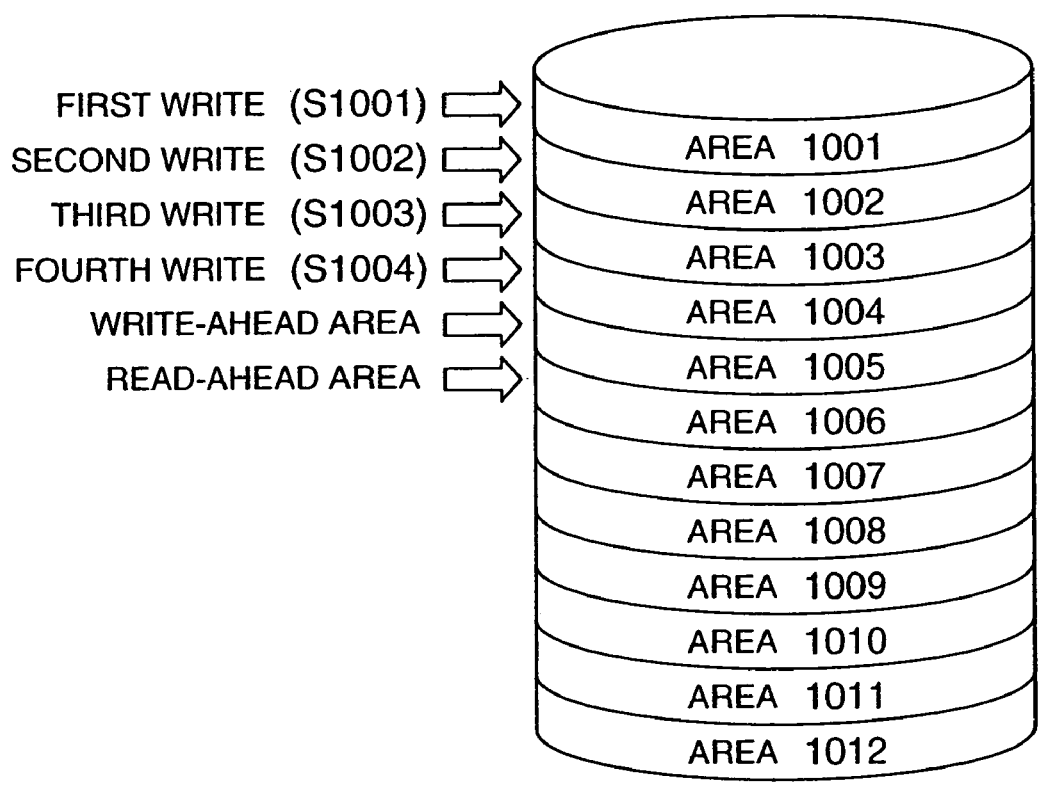
FIG. 13 shows an example of writing data by sequential access.

FIG. 13 shows an example of data writing by sequential access.

The first data writing (S1001) is performed in the area 1001, the second data writing (S1002) in the area 1002, the third data writing (S1003) in the area 1003, and the fourth data writing (S1004) in the area 1004. Because the latest area where data was written was the area 1004, the next write-ahead area is decided as the area 1005 continuously next to the area 1004. The read-ahead area is decided as the area 1006 continuously next to the write-ahead area.

Figure 14:
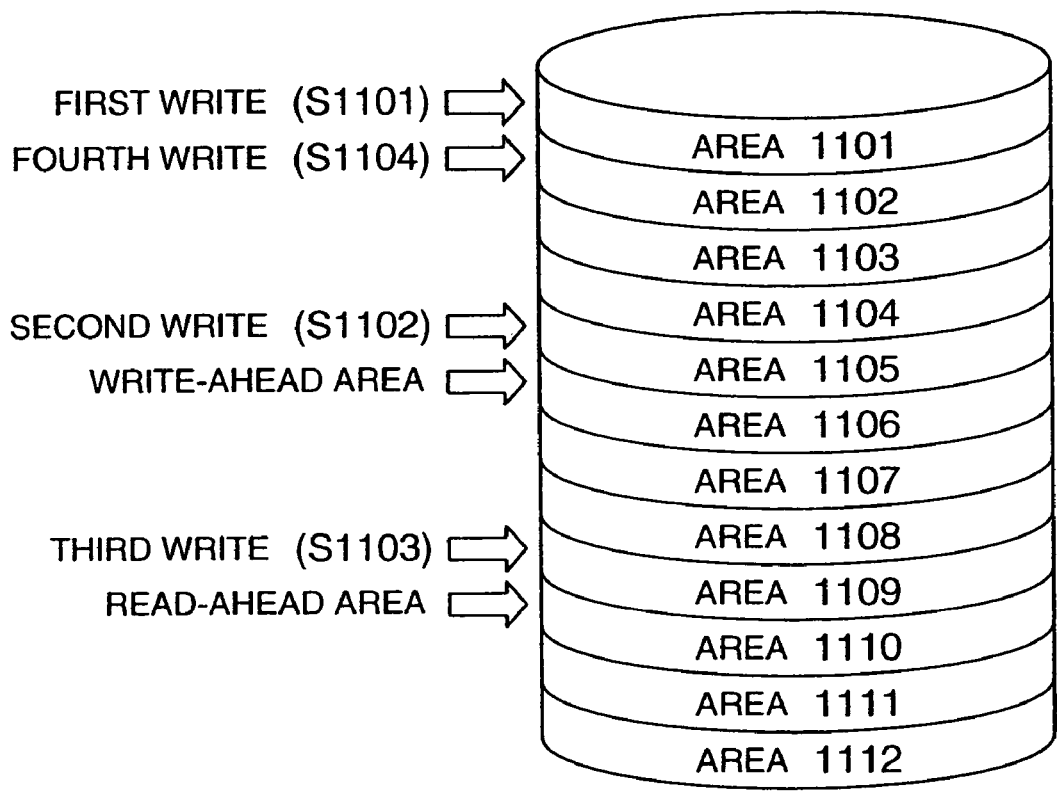
FIG. 14 shows an example of writing data by random access.

FIG. 14 shows an example of data writing by random access.

The first data writing (S1101) is performed in the area 1101, the second data writing (S1102) in the area 1105, the third data writing (S1103) in the area 1109, and the fourth data writing (S1104) in the area 1102. Because the latest area where data was written was the area 1102, the write-ahead area is decided as the area 1106, the fourth area from the area 1102, and the read-ahead area is decided as the area 1110, the fourth area from the write-ahead area.

Figure 15:
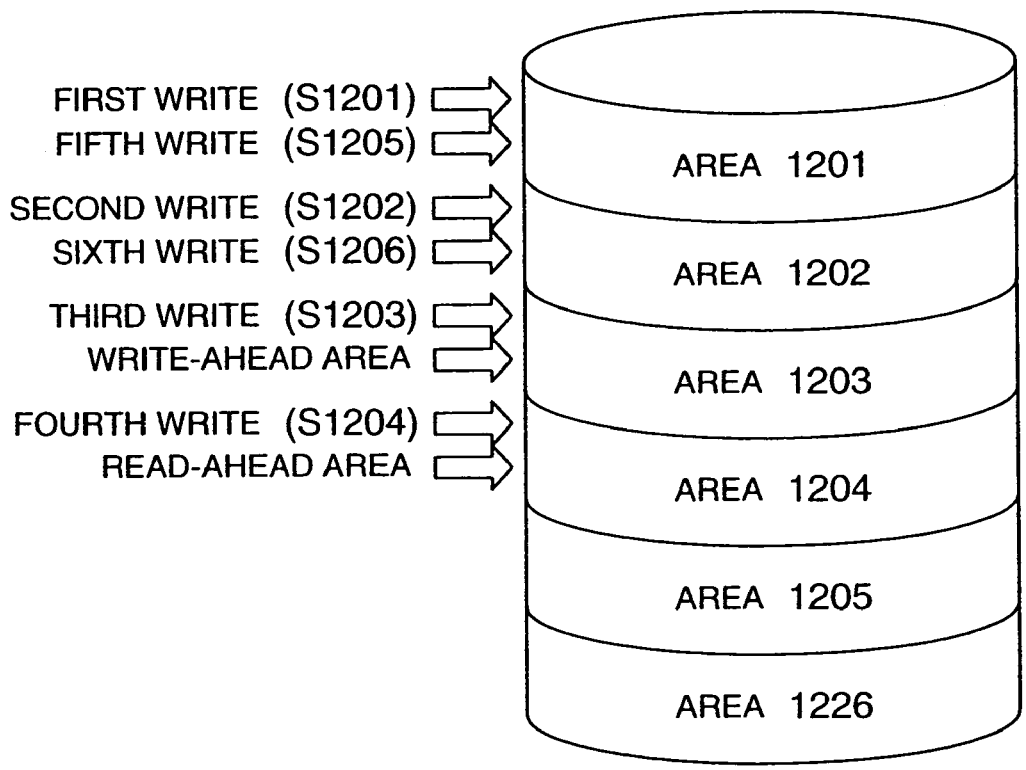
FIG. 15 shows an example of writing data by access frequency analysis.

FIG. 15 shows an example of data writing by access frequency analysis. The first data writing (S1201) is performed in the area 1201, the second data writing (S1202) in the area 1202, the third data writing (S1203) in the area 1203, the fourth data writing (S1204) in the area 1204, the fifth data writing (S1205) in the area 1201, and the sixth data writing (S1206) in the area 1202. The frequently-accessed areas are the areas 1201~1204, and the latest area where data was written is the area 1202. In the areas 1201~1204, the data access method is sequential access. Therefore, the write-ahead area is the area 1203 continuously next to the area 1202, and the read-ahead area is the area 1204 continuously next to the write-ahead area.

Figure 16:
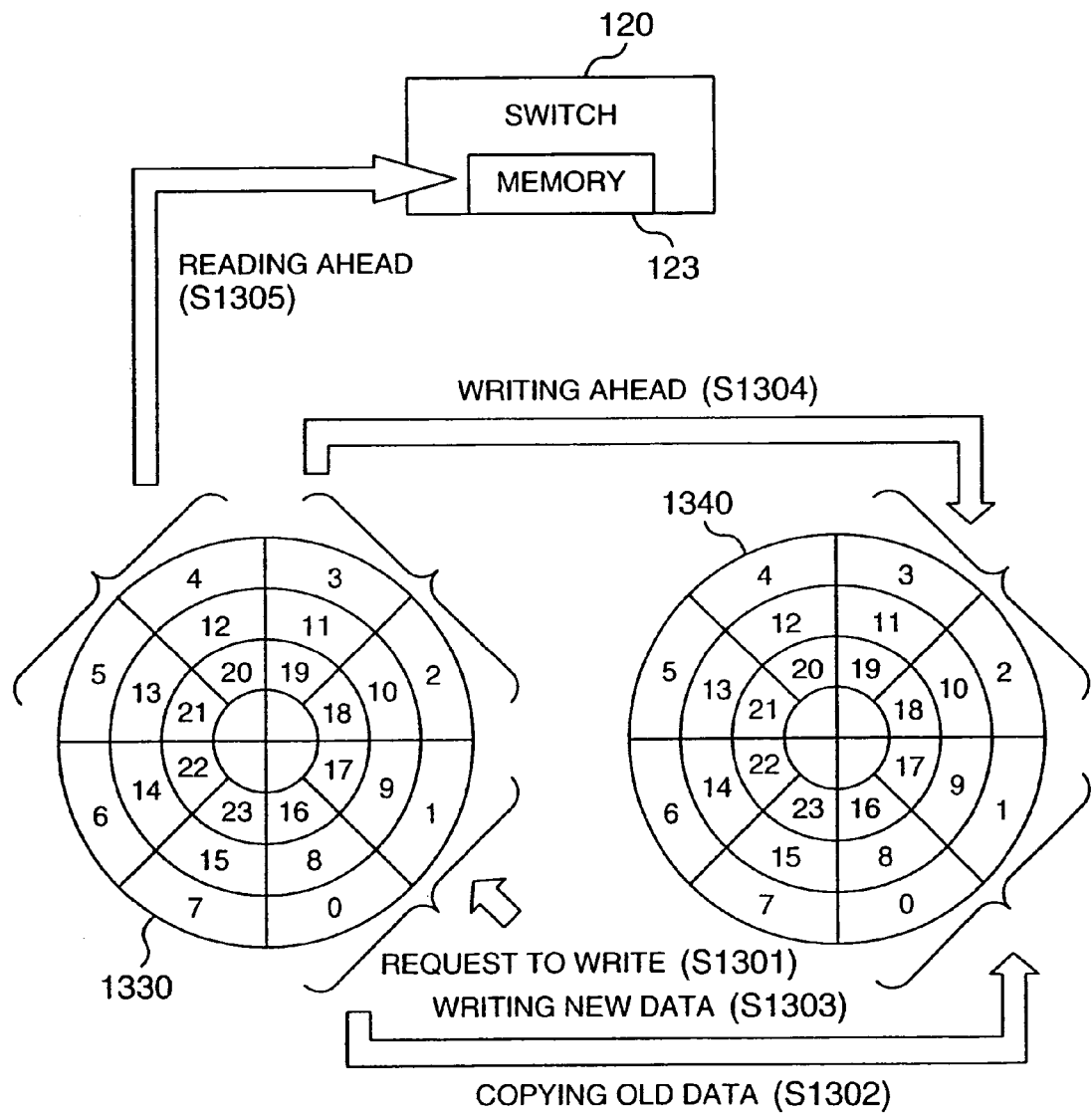
FIG. 16 shows an example of executing a write-ahead/read-ahead.

FIG. 16 shows an example of execution of a write-ahead and a read ahead. When a request comes from the host equipment 110 to write data to the sectors 0 and 1 of the source-side magnetic disk (S1301), data stored in this area is copied to the sectors 0 and 1 of the snapshot-side magnetic disk, and then new data is written into the source-side magnetic disk (S1303). After this, data on the sectors 2 and 3 of the source-side magnetic disk as the write-ahead area is copied to the sectors 2 and 3 of the snapshot-side magnetic disk (S1304). And, data on the sectors 4 and 5 of the source-side magnetic disk as the read-ahead area is copied to the memory 123 in the switch 120 (S1305).

For deciding a write-ahead operation and a read-ahead operation, methods other than shown above may be used, and they will be described with reference to FIGS. 17 and 18.

In FIG. 17, data written in the data write capacity in the data update information table 128 is stored in byte units. For example, if the write-in capacity information has data written in units of 20 bytes, the data capacity to write ahead and read ahead is decided as 20 bytes, the average value of those byte-units.

FIG. 18 shows a case where the write-ahead and read-ahead areas are decided with the data capacity for write-ahead and read-ahead operations fixed. By using LBA information obtained, the write-ahead and read-ahead areas are decided as shown in FIGS. 9~12 and data corresponding to a predetermined data capacity are written ahead and read ahead.

In this embodiment, the snapshot function is controlled by the switch 120 but may be controlled by the host equipment or the storage system.

Description will now be made of the snapshot control procedure with the host equipment 110. After deciding the write-ahead and read-ahead areas, the host equipment 110, through the switch 120, reads data in the write-ahead and read-ahead areas of the source-side magnetic disk 150, and copies data on the write-ahead area to the snapshot-side magnetic disk 160, and stores data read ahead in the memory of the host equipment 110. After this, new data is written to the source-side magnetic disk 150.

Description will then be made of the snapshot control procedure with the storage system. The storage system receives information about the location to write data in along with data to write, from the host equipment 110 through the switch 120. Subsequently, after the write-ahead and read-ahead areas are decided, data in the write-ahead area is copied to the snapshot-side magnetic disk 160, and data to read ahead is stored in the cache in the storage system. New data received from the host equipment 110 is written to the source-side magnetic disk 150.

When the snapshot function is controlled by the storage system, but if the storage system does not have a cache, if data to read ahead is stored in the memory of the switch 120 or in the memory of the host equipment 110, the read-ahead process can be carried out.

In this embodiment, the write-ahead and read-ahead processes are executed after new data has been written in the source-side magnetic disk 150; however, the write-ahead and read-ahead processes may be executed with various timing. For example, while waiting for a request to input/output data from the host equipment 110, when a request comes from the host equipment 110 to write ahead/read ahead, the write-ahead and read-ahead processes can be carried out.

In this embodiment, description has been made referring to a case where magnetic disks are used as storage devices, but this embodiment may be applied to magnetic tape, optical disks and so on.

The present invention may be applied to other embodiments, such as a case where the source-side magnetic disk is brought back to the state before data was copied (hereafter referred to as copy return).

Figure 19:
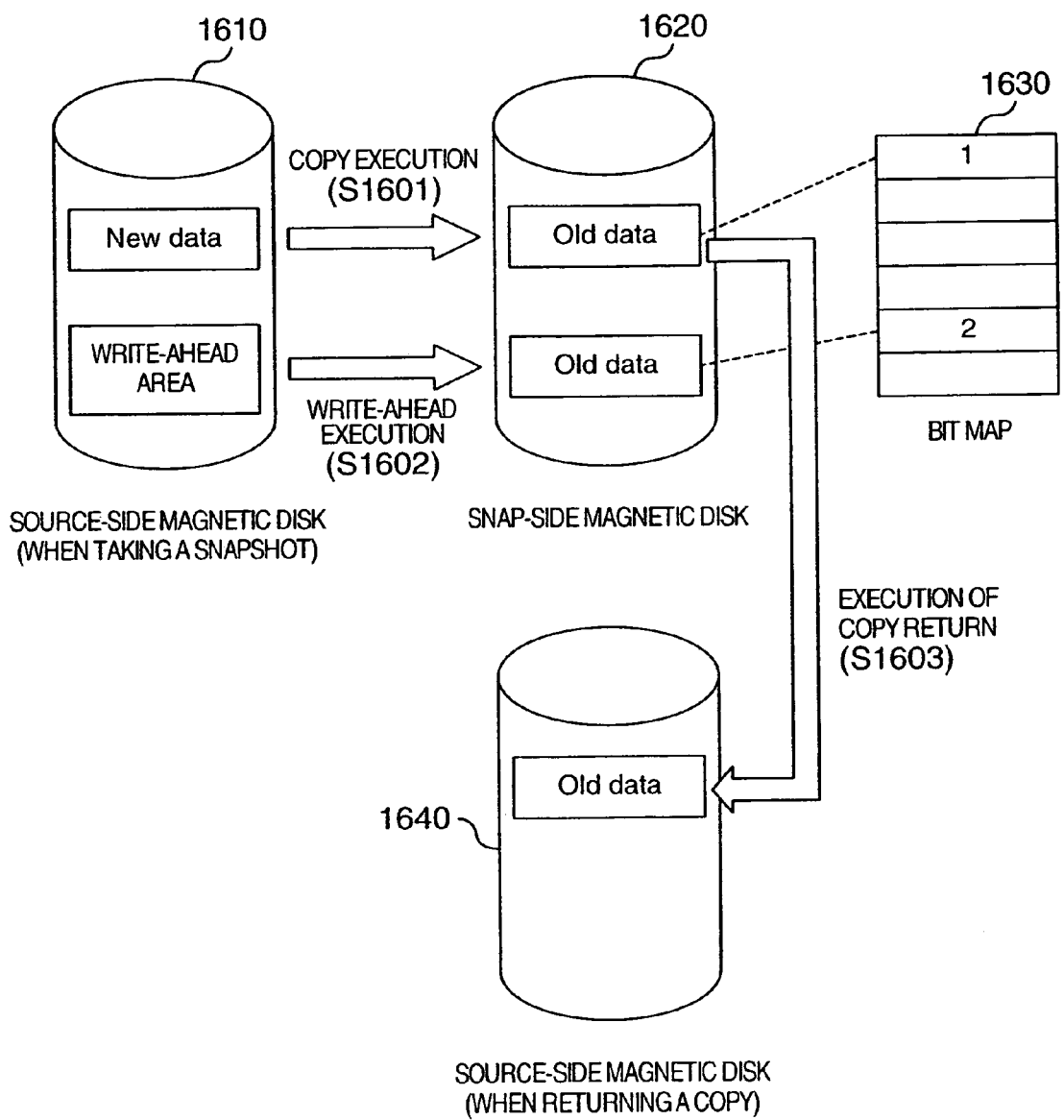
FIG. 19 shows an embodied example of returning the copy.

FIG. 19 shows an example of copy return.

A bit map 1630 uses two kinds of flag "1" or "2" for every area of the snapshot-side magnetic disk. Description will be made of a case where the copy can be returned easily by using those flags.

When a data write request comes from the host equipment 110, old data on the source-side magnetic disk 1610 is copied to the snapshot-side magnetic disk 1620 (S1601), and when new data is written in the source-side magnetic disk 1610, the "1" flag is set in the bit map 1630. By a write-ahead process (S1602), data in the write-ahead area of the source-side magnetic disk 1610 is copied to the snapshot-side magnetic disk 1620, the "2" flap is set in the bit map 1630.

After this, if it is necessary to execute copy return (S1603), only data in the areas marked by the "1" flag is returned to the source-side magnetic disk 1640. Because data in the areas marked by the "2" flag is data which was copied by "a write ahead" to the snapshot-side magnetic disk 162, new data has not been written to the source-side magnetic disk 1610, and data in the area marked by the "2" flag need not be returned to the source-side magnetic disk 1640.

By the method described above, it is easy to perform a process to bring the source-side magnetic disk 1610 back to the state 1640 before data was copied from there.

The program for executing a method for speeding up the snapshot operation in the present invention described above can be stored in a storage medium readable by a computer, or transferred to another computer through communication means, and the program can be read into memory and executed.

By analyzing data update information and deciding from the result of analysis an area where chances are high for a request to come to write data to the source-side magnetic disk, and executing a write-ahead process of writing in advance data in that area, it is possible to write data to the source-side magnetic disk on receiving a write request from the host equipment. Furthermore, by analyzing data update information and deciding by result of analysis an area where it is considerably likely for a request to come to write into the source-side magnetic disk, and by executing a read-ahead process of previously reading data in that area and storing it in memory, it is possible to copy data in memory into the snapshot-side magnetic disk quickly when a write request comes from the host equipment. By performing write-ahead and read-ahead processes in combination, the snapshot operation can be accelerated. Moreover, by using two kinds of flags in the bit map, the source-side magnetic disk can be reverted to the state before data was copied.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for speeding up a snapshot operation in a data processing system, the method comprising:

copying first data which has been stored in a source-side storage device including a disk-shaped magnetic storage to a snapshot-side storage device including another disk-shaped magnetic storage in response to a first command from a host device connected to both the source-side storage device and the snapshot-side storage device through a switching device;

determining, by the switching device, both second data to be copied to the snapshot-side storage device and third data to be successively copied with the second data to the snapshot-side storage device;

further copying the second data to the snapshot-side storage device having a predetermined relationship with the first data and simultaneously storing the third data to a memory unit provided within the switching device in response to a second command issued after the first command; and still further copying the third data in the memory device to the snapshot-side storage device having the predetermined relationship with the second data in response to a third command issued after the second command.

2. The method according to claim 1, further comprising:

writing, in response to the first command, data to a first area of the source-side storage device which has been used for storage of the first data;

further writing, in response to the second command, data to a second area of the source-side storage device which has been used for storage of the second data; and still further writing, in response to the third command, data to a third area of the source-side storage device which has been used for storage of the third data.

3. The method according to claim 2, wherein writing the data to the second area comprises checking whether or not the second area coincides with an area to which the data is to be written in accordance with information included in the second command, and wherein data is written into the second area after the second data is copied to the snapshot-side storage device if the second area is consistent with an area defined by the information included in the second command.

4. The method according to claim 3, wherein writing the data to the third area further comprises checking whether or not the third area coincides with an area to which the data is to be written in accordance with information included in the third command, if the second area is inconsistent with an area defined by the information included in the second command, and wherein data is written into the third area after the third data is copied to the snapshot-side storage device if the third area is consistent with an area defined by the information included in the third command.

5. The method according to claim 1, wherein the switching device determines that the second data is data which has been stored in the source-side storage device successively to the first data, and the third data is data which has been stored in the source-side storage device successively to the second data.

6. The method according to claim 1, wherein the predetermined relationship comprises a successive copying of data with previously copied data to the snapshot-side storage device.

7. The method according to claim 1, wherein the predetermined relationship comprises a data copying with an interval of data storage area to previously copied data, the area being calculated in accordance with an amount of the previously copied data.

8. The method according to claim 1, further comprising detecting an area of the snapshot-side storage device, a number of past access of which is maximum in each of numbers for areas of the snapshot-side storage device, and wherein the first data is copied to the area detected.

9. The method according to claim 8, wherein the predetermined relationship comprises a successive copying of data with previously copied data.

10. The method according to claim 8, wherein the predetermined relationship comprises a data copying operation with an interval of data storage area to previously copied data, the area being calculated in accordance with an amount of previously copied data.

11. A method for speeding up a snapshot operation in a data processing system, the method comprising:

copying first data which has been stored in a source-side storage device including a disk-shaped magnetic storage to a snapshot-side storage device including another disk-shaped magnetic storage in response to a first command from a host device connected to both the source-side storage device and the snapshot-side storage device through a switching device;

detecting an area of the snapshot-side storage device, a number of past access of which is maximum in each of numbers for areas of the snapshot-side storage device, and wherein the first data is copied to the area detected;

writing, in response to the first command, data to a first area of the source-side storage device which has been used for storage of the first data;

further copying a second data which has been successively stored with the first data in the source-side storage device to the snapshot-side storage device continuous to the first data, and simultaneously storing a third data which has been successively stored to the second data in the source-side storage device to a memory unit provided within the switching device in response to a second command issued after the first command;

checking whether or not an area of the source-side storage device in which the second data has been stored is consistent with an area to which data is to be written in accordance with information included in the second command;

further writing data into the area after the second data is copied to the snapshot-side storage device if the area is consistent with an area defined by the information included in the second command;

still further copying a third data which has been successively stored with the second data in the source-side storage device to the snapshot-side storage device continuous to the second data;

further checking, if the area in which the second data has been stored is inconsistent with an area defined by the signal included in the second command, whether or not an area of the source-side storage device in which the third data has been stored is consistent with an area to which data is to be written in accordance with information included in the third command; and writing data into the third area after the third data is copied to the snapshot-side storage device if the area of the source-side storage device in which the third data has been stored is consistent with an area to which data is to be written in accordance with the information included in the third command.

* * * * *